(No Model.)
T. E. TRACY.
EXTENSION CANE RULE.
No. 516,513.   Patented Mar. 13, 1894.
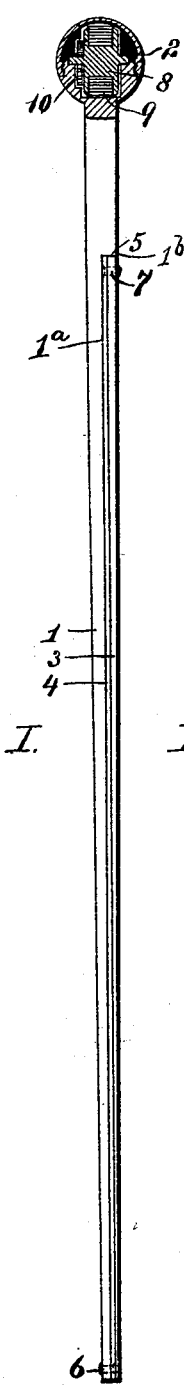
Fig. I.
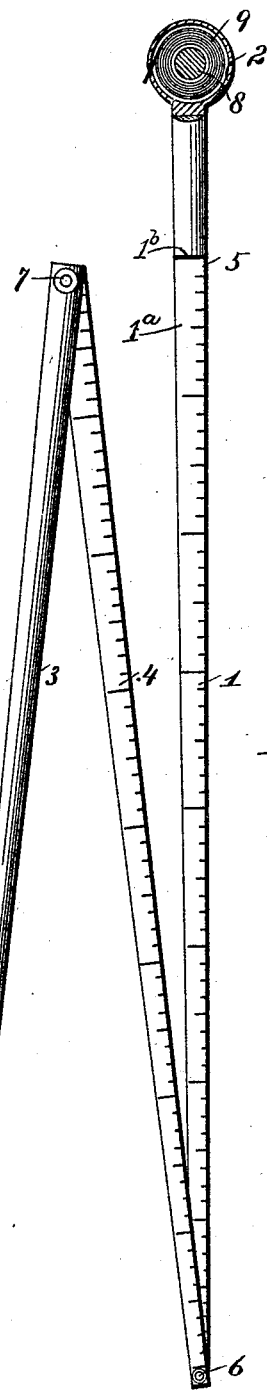
Fig. II.
Fig. III.
Witnesses:
F. G. Fischer
J. O. Mullett
Inventor:
Thomas E. Tracy
By Knight Bros
Attys

UNITED STATES PATENT OFFICE.

THOMAS E. TRACY, OF KANSAS CITY, MISSOURI.

EXTENSION-CANE RULE.

SPECIFICATION forming part of Letters Patent No. 516,513, dated March 13, 1894.

Application filed June 30, 1893. Serial No. 479,257. (No model.)

*To all whom it may concern:*

Be it known that I, THOMAS E. TRACY, of Kansas City, in the county of Jackson and State of Missouri, have invented certain new and useful Improvements in Walking-Cane Measures, of which the following is a full, clear, and exact description, reference being had to the accompanying drawings.

My invention relates to certain new and useful improvements in a walking cane measure to be used by decorators in measuring walls, ceilings, &c., or it may be used in various other ways where it is desired to measure surfaces inconvenient to reach by the ordinary measuring rule or yard stick; and my invention consists in certain features of novelty hereinafter described and pointed out in the claim.

In the drawings: Figure I, represents a view of my improved walking-cane measure in its folded position, showing the head of the same in cross section. Fig. II, represents the sections of the measure partly unfolded and a cross sectional view of the head. Fig. III represents the measure in its extended position.

Referring to the drawings:—1, represents the body of the measure which is made of the length of an ordinary walking cane, and 2, a head or knob forming a handle for the same. The body of the measure is formed with a recess 1$^a$ and with the shoulder 1$^b$ and is provided with folding sections 3, 4, the section 4 being pivoted to the body near the lower end of the latter, and extending into and fitting in the recess; and the section 3 being pivoted to the section 4 near its upper end and when closed abutting against the shoulder 1$^b$. From the point 5, a short distance from the head, the measure is graduated so as to provide a measuring scale, the intermediate strip 3, being graduated on its inner side, its scale does not show in the drawings. The outer section 3 is pivoted to the intermediate section 4 near its upper end as shown at 7 and the intermediate section 4 is pivoted to the body as shown at 6. Thus, when the measure is unfolded as shown in Fig. III, it is of considerable length; and it may be folded up so as to form a neat walking cane that does not expose the scale of the same until the measure is unfolded.

In the head or knob 2, I secure a spool 8, having a measuring tape 9 wound thereon, and a spring 10 engaging said spool and head or knob for winding up said tape when the same has been released. I can therefore, for instance, while measuring the vertical height of the wall, also measure the lateral or horizontal distance merely by pulling the tape 9, from the head or knob 2, thus determining in a very brief space of time, without having to procure a ladder, or its equivalent, the amount of wall paper it will require to cover a certain surface.

It is obvious that the measure can also be used for measuring ceiling space, floor space, and in fact, any surface desired to be measured. The measure can be made very neat and present a smooth exterior so that it can be used simply as a walking-cane, if desired.

I claim as my invention—

A walking-cane measure comprising a body 1 formed with a shoulder 1$^b$, a graduated recess 1$^a$, and a head 2, an intermediate graduated section 4 pivoted to the lower end of the body and fitting in the recess against the shoulder, the outer graduated section 3 pivoted to the upper end of the intermediate section, fitting in the recess thereover against the shoulder, and a spool 8 located in the head having a measuring tape 9 and a spring 10 for rewinding the tape; substantially as described.

THOMAS E. TRACY.

Witnesses:
R. L. SILVERMAN,
F. E. MULLETT.